C. A. T. SÖRENSEN.
BALL RETAINER FOR THRUST BALL BEARINGS.
APPLICATION FILED AUG. 14, 1914.
1,169,881.
Patented Feb. 1, 1916.
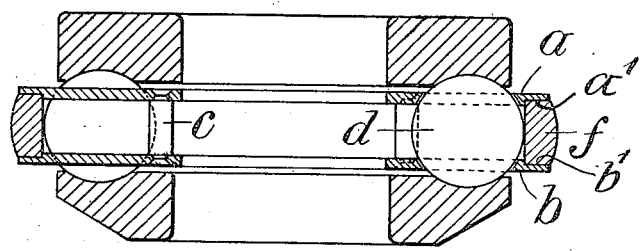
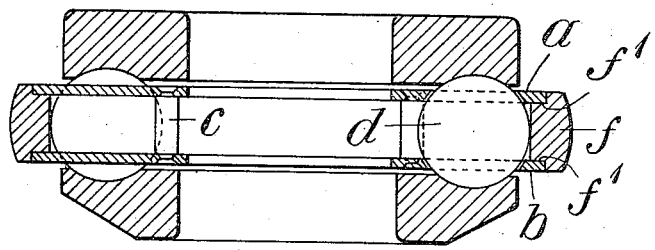
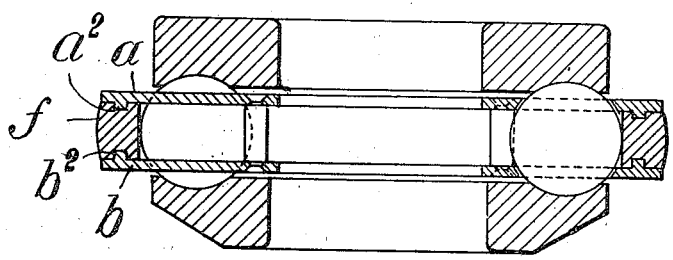
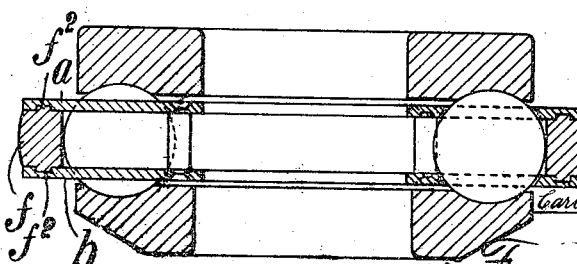
Witnesses:
Inventor:
Carl August Theodor Sörensen
By Attorneys,

UNITED STATES PATENT OFFICE.

CARL AUGUST THEODOR SÖRENSEN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BALL-RETAINER FOR THRUST BALL-BEARINGS.

1,169,881.

Specification of Letters Patent.

Patented Feb. 1, 1916.

Application filed August 14, 1914. Serial No. 856,750.

*To all whom it may concern:*

Be it known that I, CARL AUGUST THEODOR SÖRENSEN, a citizen of the Kingdom of Sweden, residing at Gottenborg, Sweden, have invented new and useful Improvements in Ball-Retainers for Thrust Ball-Bearings, of which the following is a specification.

This invention relates to ball retainers for thrust ball bearings of the kind which consists of a member keeping the balls apart, and a ring surrounding and forming an outer support for the balls.

It has already been proposed to reduce the friction between the ball retainer and the balls by making the ring which supports the balls rotatable in relation to the part of the ball retainer keeping the balls apart. In such devices there is however no means provided for keeping the parts of the ball retainer centered relatively to each other which, under unfavorable circumstances, can cause the balls to press strongly against the part of the ball retainer keeping the balls apart, resulting in wear and tear as well as seizing of the parts.

This invention has for its object to prevent the said drawbacks and consists, chiefly, in this that both main parts of the ball retainer are in such engagement with each other that a radial displacement of the parts over against each other is prevented. Since said both parts of the ball retainer, as mentioned above, should be rotatable in relation to each other, the said engagement is to be effected in such manner that the rotation can take place without hindrance.

These and other objects may be attained by means of the construction illustrated in the accompanying drawing in which—

Figures 1 to 4 inclusive show different sectional views of the invention.

Referring to Fig. 1, two plates $a$ and $b$ are secured to each other by means of bolts $c$ or the like and provided with apertures engaged by the balls so that the latter are kept apart in well known manner. The outer ring $f$ forming an outer support for the balls is rotatable relatively to the plates $a$ and $b$. The engagement between the parts of the ball retainer is effected by the plates $a$ and $b$ being provided with annular recesses $a^1$ and $b^1$ respectively provided on the sides facing the ring $f$, in which recesses the ring $f$ fits tightly so that the parts of the ball retainer are kept centered relatively to each other. This constructional form has proved to be practical as well as easy and cheap to manufacture. If desired, the engagement may be limited to one of the plates $a$ or $b$ only.

In the constructional form shown in Fig. 2 the ring $f$ is provided on each side with annular recesses $f^1$, $f^1$ engaged by the plates $a$ and $b$. In other respects the device is substantially equal to that shown in Fig. 1.

The engagement between the two main parts of the ball retainer may also be effected by providing the plates $a$ and $b$ with annular flanges or projection $a^2$ and $b^2$ engaging corresponding grooves in the ring $f$, as shown in Fig. 3, or by providing the ring $f$ with annular flanges or projections $f^2$, $f^2$ engaging corresponding grooves in the plates $a$ and $b$, as shown in Fig. 4. Also in the latter case the engagement, if desired, may be limited to either plate $a$ or $b$.

By means of the arrangement described the advantage is obtained that the balls $d$ in outward direction bear against the member $f$ only and, consequently, at a single point (the pole of rotation). The balls $d$ bear, it is true, against the member $a$ in points lying on a circle, the center of which is located on the axis of the bearing, but the pressure in these points is considerably smaller than in outward direction (*i. e.* in the direction of the centrifugal force) and on account thereof no friction detrimental to the bearing can arise at said points of engagement.

Having thus described my invention, what I claim and desire to secure by Letters Patent, is:—

1. A ball retainer for thrust ball bearings, consisting of a ringshaped part for encircling the balls, and a ball retaining part, said parts being in such engagement with each other that they can rotate in relation to each other, while radial displacements of said parts in relation to each other are prevented, substantially as and for the purpose set forth.

2. A ball retainer for thrust ball bearings, consisting of a ring-shaped part for encircling the balls, and a ball retaining part composed of two perforated plates rigidly connected to each other, said parts being in such engagement with each other that they can rotate in relation to each other while radial displacements of said parts in relation to each other are prevented, substantially as and for the purpose set forth.

3. A ball retainer for thrust ball bearings, comprising a retaining part composed of two plates perforated for receiving the balls and spaced apart and rigidly connected, and a ring located in the space between the plates outwardly of the perforations, the ring and plates having coöperative abutting shoulders permitting relative rotation of the plates and ring and preventing relative radial movement thereof.

In testimony whereof I have hereunto set my hand in presence of two subscribing witnesses.

CARL AUGUST THEODOR SÖRENSEN.

Witnesses:
K. E. WIBERG,
G. NORDSTRAND.